United States Patent

[11] 3,580,221

| [72] | Inventor | Theodore A. Noyes |
| | | 320 Dunn St., Bryan, Tex. 77801 |
| [21] | Appl. No. | 872,980 |
| [22] | Filed | Oct. 31, 1969 |
| [45] | Patented | May 25, 1971 |

[54] VACUUM SUPPORT FOR ANIMALS
8 Claims, 5 Drawing Figs.

[52] U.S. Cl. ................................................ 119/96,
119/102, 214/652, 294/64, 294/65
[51] Int. Cl. ........................................... A01k 29/00,
A01k 67/00
[50] Field of Search .......................................... 119/96,
100, 102, 101; 294/64, 65; 214/652

[56] References Cited
UNITED STATES PATENTS
2,743,701  5/1956  Boyd ........................... 119/100

2,783,078  2/1957  Billner ........................... 294/65
3,367,705  2/1968  Ames ........................... 294/64

Primary Examiner—Aldrich F. Medbery
Attorneys—Clarence A. O'Brien and Harvey B. Jacobson ABSTRACT: A vacuum supporter, including a rigid shell, shaped in the contour of an animal's back. A screen is attached in spaced underlying relation to the shell, the screen being adapted to contact the animal's back. A seal is positioned around the outer edge of the shell so that upon introduction of vacuum pressure in the space between the shell and screen, sufficient suction force can be maintained. The vacuum maintains contact between the animal and the supporter when hoists lift the supporter and animal.

Theodore A. Noyes
INVENTOR.

BY Clarence A. O'Brien
and Harvey B. Jacobson
Attorneys

Patented May 25, 1971 3,580,221

Theodore A. Noyes
INVENTOR.

BY Clarence A. O'Brien
and Harvey B. Jackson
Attorneys

VACUUM SUPPORT FOR ANIMALS

The present invention relates to a vacuum device for engaging a convalescing animal to reduce the strain on the animal's legs.

Convalescent supports for large animals have not been significantly improved in many years. In the case of a horse with a broken leg, it is common to vertically support the animal by use of a conventional bellyband sling. However, due to the great forces exerted on the horse's thoracic/abdominal areas there is considerable likelihood that the animal will die from either colic pneumonia or pressure necrosis.

The present invention is directed to a method for supporting large animals during convalescing, in a manner that will not endanger life. The present device utilizes a vacuum supporter that is positioned on the animal's back in the same manner as a saddle. The present vacuum supporter exerts rather evenly distributed forces on the skin of the animal so that the skin and flesh are retained in nearly natural contours. A seal is provided around the present device so that vacuum pressure may be retained therein. However, the seal is designed to allow a small rate of leakage allowing air circulation across the body portion of the animal that is engaged by the device.

It should be noted that the preferred embodiment of the present invention is intended to exert supporting forces on an animal sufficient to substantially reduce the strain on the animal's legs during a convalescing period. Otherwise stated, the present invention is adapted to support an animal having its feet either touching or not touching the ground during any portion of a convalescing period. However, the principles of the present invention may be applied so that the vacuum supporter covers a greater or lesser portion of the animal body than illustrated, so that considerable variation in the vacuum pressure may be effected.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
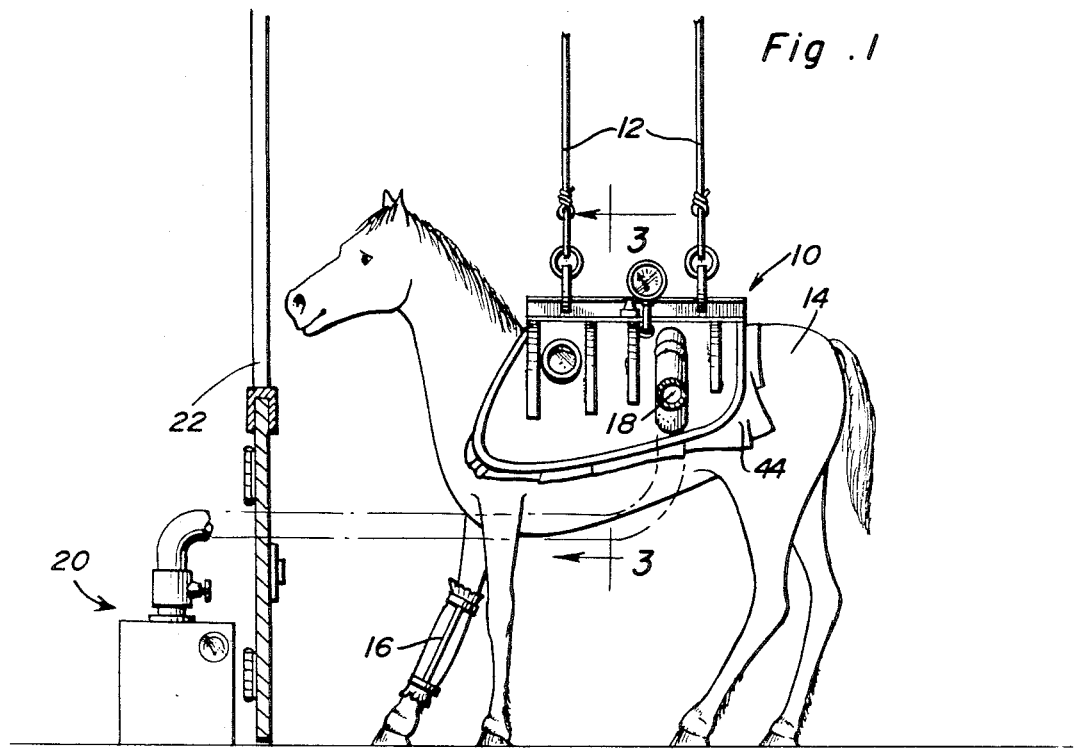
FIG. 1 is a side elevational view illustrating the present vacuum supporter in position on a horse.

Referring to the figures and more particularly FIG. 1, the present vacuum supporter is generally indicated by reference numeral 10 and is seen to take the general shape of a saddle. By way of illustration, the vacuum supporter is shown supported by cables 12 in a saddling position on a horse 14. However, as will be appreciated, the dimensions and contours of the vacuum supporter 10 can be varied to accommodate other animals.

The primary intended function of the present invention is to exert lifting forces on the animal sufficient in degree to reduce the strain upon the animal's legs during a convalescing period. Thus, in the even a horse's foreleg is broken and splinted, as indicated by 16, utilization of the present device will greatly relieve the strain upon the animal's legs to promote healing.

A conduit or hose 18 is connected at one end to the vacuum supporter while the opposite end is fitted in a vacuum generator generally indicated by reference numeral 20 which does not, per se, form a part of the present invention. The illustration of FIG. 1 includes a stall 22 depicting the usual environment for a convalescing animal.

Figure 2:
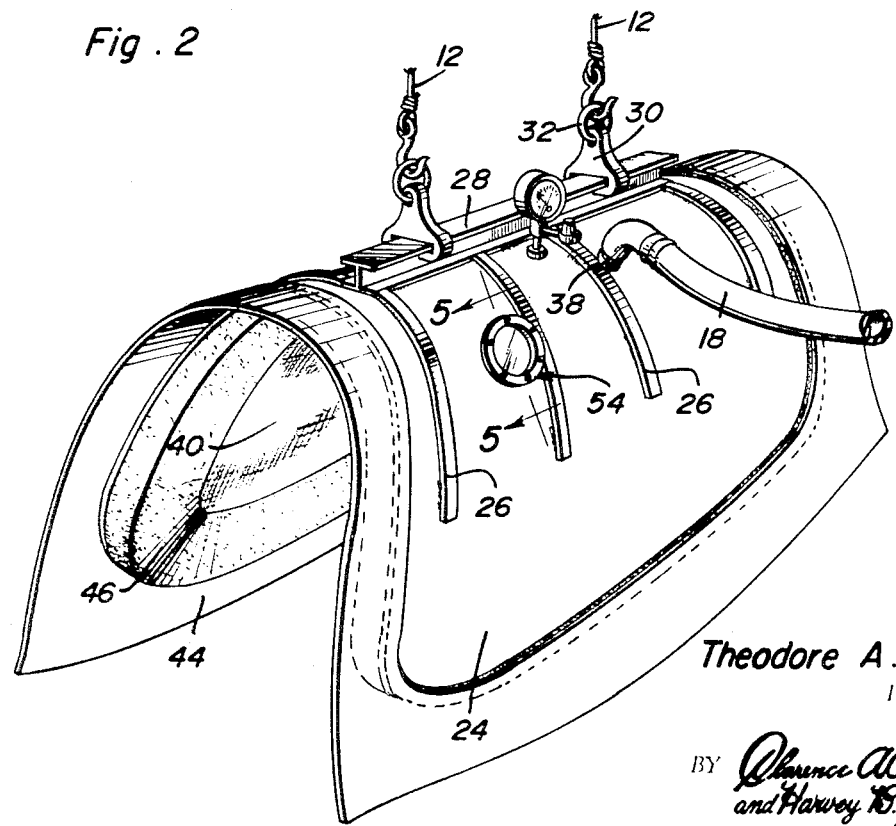
FIG. 2 is a perspective view illustrating the vacuum supporter.

Referring to FIG. 2, the actual construction of the vacuum supporter will be clearly shown to include a rigid shell or contoured plate 24 being shaped to conform with the natural lines of the animal's back. Generally, the shape of the shell 24 may be likened to that of a saddle. A series of parallel spaced annular plates 26 may be welded or otherwise suitably attached over the top of the shell 24 for strengthening the shell. A suitably dimensioned I-beam 28 is positioned in perpendicular relation across all of the plates 26 and suitably fastened thereto by means of welding or the like. Slidable riding members 30 are mounted to the upper flange of the I-beam 28 and allow the connection of respective hook and eye connectors 32 to the members. Supporting cables 12 are connected to the hook members of the hook and eye connection and serve to transmit lifting force between hoists above and the vacuum lift device. The vacuum supporter 10 is brought into contact with the animal 14 and then the vacuum pump 20 is turned on and generates sufficient suction to firmly attach the vacuum supporter 10 to the horse 14. Then hoists attached above the cables 12 are turned on and lift the cables 12, vacuum supporter 10 and the horse 14 as a unit. The entire horse may be lifted completely from the ground, or any portion of the horse's weight may be taken up in the operation of the hoists. As healing progresses, less and less weight may be taken up through the use of the vacuum supporter, and more and more weight may be put on the horse's legs. At all times the horse is in the naturally upright position.

The outlet end of vacuum hose 18 is connected to a suitable fitting 38 mounted in the shell 24 thereby providing communication between the underside of shell 24 and the vacuum generating source 20 (FIG. 1).

Figures 3, 4, 5:
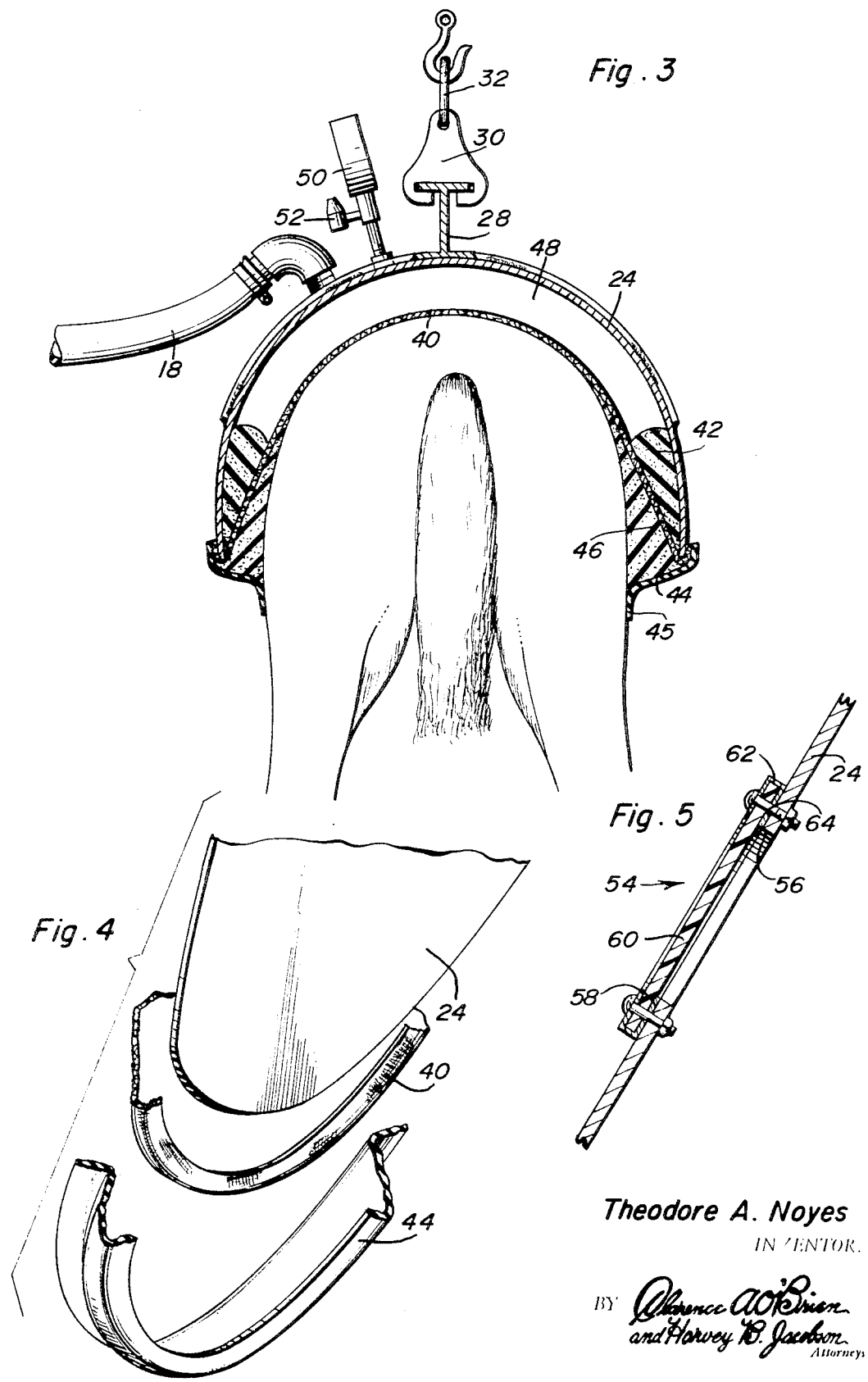
FIG. 3 is a sectional view taken along a plane passing through section line 3-3 in FIG. 1.
FIG. 4 is an exploded view illustrating the disposition of connected edges of the supporter components.
FIG. 5 is a partial sectional view taken along a plane passing through section line 5-5 in FIG. 2 showing a viewing port in the vacuum supporter.

Referring to FIGS. 2—4, a foraminous sheet in the form of a screen 40 is disposed in underlying spaced relation to the shell 24. The spaced relation between the screen and the shell is clearly illustrated in FIG. 3. The screen may be fabricated from nylon or other suitably strong flexible material. Instead of the screen, one can use a porous permeable material occupying the entire space 48 between the shell 24 and the horse 14.

A first pad 42 is disposed along the lower connected edges of shell 24 and screen 40. A second similar pad 46 is positioned between the underside of screen 40 and the confronting portion of the animal's back. In a preferred embodiment of the invention the pads 42 and 46 are fabricated from a relatively stiff sponge rubber material permitting controlled air leakage therethrough. The pads are attached to respective components of the vacuum supporter by gluing or other suitable means.

A seal in the form of a skirt 44 peripherally extending from shell 24 is fabricated from elastomeric material, such as rubber. One edge of skirt 44 is connected to the intersecting outer edges of screen 40 and shell 24. Upon generation of vacuum pressure in the supporter, the skirt 44 is sucked into engagement with the outer edge of pad 46 while the free edge 45 of skirt 44 contacts the horse's body. Thus, the peripheral edge of the vacuum supporter is sealed to permit retention of vacuum pressure under the supporter. However, by design, the seal will not be a perfect one. A small amount of air leakage is desirable to permit ventilation or air circulation across the portion of the animal's body being effected by the vacuum supporter. Also, it is to be noted that although the pads 42 and 46 are stated to be fabricated from a relatively stiff sponge material, an inflatable and deflatable pneumatic pad can be employed.

Referring to FIG. 4, the outer edge of screen 40 is seen to be folded or tucked over the outer edge of shell 24 and glued thereto. Also, a first edge of skirt 44 is rolled or tucked over the folded screen edge and glued to it. This connection of vacuum-supported components effects attachment of the shell 24, screen 40 and skirt 44 at a common peripheral edge.

The space 48 between shell 24 and screen 40 is clearly illustrated in FIG. 3. The space forms a sealed chamber which communicates with the source of vacuum through the hose 18. It is desirable to include a monitoring pressure meter 50, mounted to the upper portion of shell 24 and communicating with chamber 48 to display readings of the pressure condition thereon. A bleeder valve 52 is connected to the meter 50 thereby permitting regulation of the pressure conditions in chamber 48.

In order to monitor the condition of the animal's skin under the supporter, a viewing port generally indicated by 54 is connected to the shell 24 and will be shown in greater particularity in FIG. 5. As will be seen in that Figure, the viewing port includes an aperture 56 formed in shell 24. A gasket 58 resides in overlying annular relation to the aperture 56 and a transparent circular plate 60 fabricated from plexiglas or the like, is disposed in juxtaposed contact with gasket 58. An annular retaining ring 62 is mounted over the plexiglas and is clamped to the shell 24 by means of suitable peripherally disposed fasteners 64.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What I claim as new is as follows:

1. In animal restraining and back support means for applying vertical lifting force to remove weight from the animal's legs comprising a vacuum source, a vacuum supporter comprising a rigid shell, an inlet formed in the shell communicating with the source, means connected to the shell for maintaining a preselected supporter position, a pressure-conveying sheet connected in underlying spaced relation to the shell for retaining an irregular portion of an animal body supported against the sheet by evenly distributing vacuum pressure over the body, and means for sealing the shell to the body for maintaining vacuum pressure in the supporter.

2. The device set forth in claim 1 together with a skirt extending from the outer edge of the shell for sealing action of the supporter against the body.

3. The structure set forth in claim 1 wherein the means for maintaining a preselected supporter position comprises a member fixedly attached to the shell, and means connected to the member for suspending the supporter in the preselected position.

4. The device set forth in claim 1 wherein the shell is shaped to the contour of an animal's back to permit saddling of the supporter on the animal's back, the vacuum pressure distributed by the supporter being exerted on the animal's back to urge upward lifting of the animal.

5. The structure set forth in claim 4 together with means mounted in the shell to permit viewing of the animal's skin under the supporter.

6. The device of claim 1 wherein the pressure-conveying sheet is fabricated from screen material being attached to the shell.

7. The device of claim 1 wherein the pressure-conveying sheet is fabricated from a fine-pored permeable material disposed between the shell and the irregular body.

8. The device set forth in claim 1 wherein the shell is shaped to provide support of the pressure-conveying sheet in a manner to follow the contours of the irregular body and to allow vacuum pressure distribution to be exerted on the body for urging the upward lifting thereof.